United States Patent [19]

Penttila et al.

[11] Patent Number: 5,085,875
[45] Date of Patent: Feb. 4, 1992

[54] PROCESS OF MAKING A YEAST FIBER COMPOSITION

[75] Inventors: Liisa Penttila, Espoo; Timo Vaara, Helsinki, both of Finland

[73] Assignee: Alko Ltd., Helsinki, Finland

[21] Appl. No.: 598,178

[22] Filed: Oct. 15, 1990

[51] Int. Cl.⁵ .............................................. A23L 1/29
[52] U.S. Cl. ........................................ 426/62; 426/60
[58] Field of Search ................................. 426/60, 62

[56] References Cited

U.S. PATENT DOCUMENTS

| | | | |
|---|---|---|---|
| 3,947,605 | 3/1976 | Chao | 426/60 |
| 3,975,553 | 8/1976 | Griffon | 426/60 |

FOREIGN PATENT DOCUMENTS 1003976 9/1965 United Kingdom .
9004334 5/1990 World Int. Prop. O. .

Primary Examiner—Donald E. Czaja
Assistant Examiner—Helen Pratt
Attorney, Agent, or Firm—Wolf, Greenfield & Sacks, P.C.

[57] ABSTRACT

A smooth textured composition of yeast cells, more than 50% of the yeast cells comprising whole yeast cell walls, the composition comprising at least about 40% by weight of fiber and less than about 1.6% by weight of nucleic acid.

23 Claims, No Drawings

PROCESS OF MAKING A YEAST FIBER COMPOSITION

FIELD OF THE INVENTION

The present invention relates to a mild flavored, smooth-textured yeast fiber product. More particularly, the invention relates to methods for production and methods for use of the yeast fiber product in health food and animal feed.

BACKGROUND OF THE INVENTION

The importance of fiber in diet is generally acknowledged. Most of the fiber products now in the markets are derived from cereals and vegetables. Fibers from these origins mostly contain insoluble fiber, which have a coarse texture. Coarse fibers can cause certain structure problems in food products. For example in liquid or soft food products coarse particles are often undesirable. Yeast fiber has a smooth texture and it does not cause structure problems in products where coarse particles are not desired.

Yeast has been eaten throughout history in bread, beer and wine. In these products the function of yeast is fermentation. Yeast is also used in small amounts in food products as a source of vitamins and other nutrients. Yeast has a strong and distinctive taste, which restricts its use in food. Therefore, yeast extracts are used to give and enhance food flavors and as a source of nutrients. Yeast extracts are made from the cell contents by autolyzinq or mechanically breaking up yeast cells. U.S. Pat. Nos. 3,867,544; 4,122,196; and 4,810,646, the disclosures of which are incorporated herein by reference, disclose processes preparing glucan from yeast. The yeast products obtained by such processes are either highly purified or they are complex and expensive.

An object of the present invention is to provide a simple and inexpensive method for processing yeast to a fiber product with mild-flavor, smooth texture and properties beneficial for the health.

SUMMARY OF THE INVENTION

In accordance with the invention there is provided a mild-flavored, smooth textured yeast product with elevated amounts of fiber and decreased amounts of nucleic acids. The majority of the yeast cells of the yeast product have whole cell walls in spherical form, i.e. not fragmented. The yeast product contains, calculated as percentage of dry matter, at least about 40% to about 70%, typically about 60%, total fiber and less than about 1.6% nucleic acids, typically less than about 0.08% nucleic acids and most preferably less than about 0.03% nucleic acids. The yeast is prepared from edible yeasts strains, preferably from Saccharomyces or Candida strains.

In accordance with the invention the yeast fiber product is prepared via extraction comprising a heating step. Selected yeast cells are heated in a water solution, an alkali or acidic solution for about 15–60 minutes at about 80–120° C. After the heating step the extracted yeast cells are washed at least two times with water. The washed yeast cells are separated and further processed by conventional methods.

The yeast product of the present invention can be added to soft textured or liquid food products to obtain a multitude of tasty health food products for human beings. It can also be used as a dried powder, granules or as compressed pills or tablets. The yeast product is also a useful additive in animal feed.

DETAILED DESCRIPTION OF PREFERRED EMBODIMENTS

The process for preparing the yeast composition of the invention comprises an extraction of yeast cells where a portion of the cell contents is removed. The yeast cell walls remaining after extraction of the cell contents are washed and dried. The product has a bland flavor and can be used as a smooth textured source of fiber in food products. Extraction of the cell contents of the selected yeast cells greatly reduces the taste of the resulting yeast composition product such that the taste of the resulting product does not restrict its use in human foods.

Extraction of a portion of the selected yeast cell content is effected by heating the selected yeast cells in a water solution, preferably an aqueous alkali or acidic solution followed by purification of the product by washing the resulting extracted yeast cells. As a source of biomass strains any edible yeast strains can be used. Most preferred are Saccharomyces and Candida strains. The yeast biomass starting material is produced by conventional methods known in the art. The yeast strains, raw materials and production methods are preferably food grade. Non food grade raw materials and other yeast strains, such as Brettanomyces, Debaryomyces, Hansenula, Pichia, Torulopsis can also be used to prepare similar yeast products, which are not intended for use as human food products. For example, where the selected yeast is a conventional baker's yeast, the yeast is grown by a conventional fed batch fermentation process using molasses as the primary raw material for growing and is harvested by conventional centrifugation or filtration. Where a brewer's yeast might be employed as the starting material, it may typically be obtained as the by product of a brewing process.

The resulting yeast product composition of the invention contains mostly yeast cells having a whole (spherical) cell wall and a minor portion of cells having a fragmented cell wall. The original yeast cell biomass comprises whole yeast cells. In the extraction process, a portion of the cell contents is extracted from the cells through the cell walls or through small ruptures in the cell walls with the cell walls maintaining their whole spherical form. The cell walls of a minor portion of the cells is so far ruptured that the cell walls are fragmented losing their spherical form. Relative to the selected yeast starting material, the resulting product when prepared with solution of at least about 4% of sodium hydroxide or hydrochloric acid, has a higher level of carbohydrates, a lower level of protein, and a significantly lower level of nucleic acids.

A typical process for the production of the yeast product according to the invention comprises:

(a) extracting selected yeast cells by heating in a water solution, preferably an alkali or acidic solution for a sufficient time and at a temperature sufficient to obtain a yeast cell composition as described above, i.e. a composition containing yeast whole cell walls and a minor portion of fragmented yeast cells; and, (b) washing the extracted yeast cell composition at least two times with water.

After the extraction and washing procedure the yeast product may be further processed by conventional methods for preparation and storage of the product for later incorporation into a food or animal feed product.

Although it is possible to use only water in the extraction step, the resulting yeast product typically contains higher amounts of nucleic acid. Thus, it is preferable to use a dilute solution of sodium hydroxide or hydrochloric acid in the extraction step. Heating is preferably performed in solutions comprising 0.5-5% by weight sodium hydroxide or hydrochloric acid. When hydrochloric acid is selected, a solution of at least about 4% by weight in concentration is most preferred. It is possible to use other acids or alkalis to achieve the same goal. Other suitable acids, for example, are acetic acid, citric acid and $H_2SO_4$. Other suitable alkalis are, for example, KOH, $Mg(OH)_2$ and various buffer solutions. Such alternative acidic or alkali solutions are less preferred insofar as they are less economical.

A preferred heating temperature range is between about 80° C. and about 120° C., and most preferably about 100° C. Typically the yeast cells are heated for about 15 to about 60 minutes, and most preferably about 30 minutes.

The starting yeast biomass material is grown, washed and harvested by conventional means, most preferably using food grade strains and raw materials for growing the biomass.

During the extraction process the yeast content in the extraction solution is usually between about 5% to about 20% by weight on a dry matter basis per unit volume of solution, i.e. 5% to 20% w d.m./v. (or yeast dry matter by weight).

After extraction, the yeast cell composition is typically recovered from solution by centrifugation and separation. The separated cell mixture is washed from two to four times with water and again separated from the wash water by centrifugation. The cell mixture can also typically be separated and washed by microfiltration and other conventional methods. The resulting product can be subsequently prepared for ultimate incorporation into a human food or animal feed product by freeze drying, spray drying or other suitable, conventional methods, which may be selected to suit the particular application of the final product.

The resulting product contains on a dry matter basis less than about 1.6% by weight, preferably less than about 0.08% and most preferably less than about 0.03% nucleic acid. The total fiber content of the product ranges from between about 40% and about 70% by weight. Most preferably the total fiber content of the resulting dry yeast composition product is about 50% or more by weight.

Yeast glucan is known to have an ability to decrease the concentration of blood cholesterol. According to U.S. Pat. No. 4,251,519, the disclosure of which is incorporated herein by reference, whole yeast cell walls are more effective in decreasing the blood cholesterol level than fractured yeast cells. Because the yeast fiber product of the present invention is mostly composed of yeast cells having a whole cell wall where glucan is located in the outermost layer, the product might be useful for decreasing or preventing the increase of the concentration of blood cholesterol.

The high fiber content of the yeast product and the fact that it contains mostly whole cell walls which might decrease the blood cholesterol, makes the product of the present invention useful in the production of health foods.

Consequently, the yeast product of the present invention is especially useful in preparing soft-textured food products with mild taste and with properties beneficial for health. It has been found that the resulting high fiber yeast cell composition of the invention may be added to conventional food recipes in amounts ranging from between about 1% and about 10%, typically about 5%, by weight of the total weight of a conventional food recipe, without substantially affecting the texture or taste of the original food recipe.

Food products in which the composition of the invention are especially useful are dry soup mixes, e.g. cheese soup or champion soup, cream cheeses, juices, e.g. tomato juice, and sour milk products such as yogurt. Such products may further be flavored by suitable flavoring agents to camouflage any flaws in taste or flavor which the yeast cell composition of the invention may impart to the foodstuff.

The yeast product of the present invention can also be used to prepare pills or tablets, granules or powders acting as a source of fiber and to control the concentration of blood cholesterol.

Such pills and tablets may be prepared by conventional means such as by pressing the yeast product into pill or tablet form with conventional tabletting equipment. Conventional fillers, binders and the like may also be included in such pills or tablets. The amount of the yeast product included in such pills or tablets is preferably about 80-90% by weight. The yeast product can also typically be spray dried and filled into capsules or used as powders in convenient dosage packages.

Preparation animal feed products are also within the scope of the present invention. The process comprises adding suitable amounts of the yeast product of the invention into conventional animal fodder.

The following examples describe the invention in more detail.

Example 1 - Preparation of Yeast Fiber Product by Water Extraction 100 grams of fresh commercial baker's yeast was suspended in 250 milliliters of water. The slurry was incubated at 100° C. for 30 minutes with agitation. The yeast cells were separated from the slurry by centrifuging at 3000 rpm for 10 minutes. The separated yeast cells were washed by re suspension in 250 milliliters of water, adjusting the pH to 7 and subsequent separation by centrifugation. The washing procedure was repeated three times. The yeast fiber product was dried by freeze drying.

Example 2 - Preparation of Yeast Fiber Product by Alkali Extraction 100 grams of fresh commercial baker's yeast were suspended in 250 milliliters of 2% (by weight) NaOH solution. The slurry was incubated and the cells were separated, washed and dried according to Example 1.

Example 3 - Preparation of Yeast Fiber Product by Acidic Extraction 100 grams of fresh commercial baker's yeast were suspended in 250 milliliters of 4% (by weight) HCl solution. The slurry was incubated and the cells were separated, washed and dried according to Example 1.

Example 4 - Analysis of Yeast Fiber Compositions Prepared by Various Methods

The soluble and insoluble fiber content of yeast fiber compositions prepared by various extraction routines set forth in Column 1 of Table 1 were analyzed by a method described by Asp, N. G. and Johansson, C. G., 1983 in *Nutr. Abstr. Rev.;* Vol. 54, 735-752.

The total carbohydrate contents of the various compositions were analyzed by adding 3 ml of cold (5° C.) 72% (by weight) $H_2SO_4$ to 0.3 g of dried product and incubating the test tubes at 30° C. for about 60 minutes. The resulting solutions were diluted with 84 ml of water and autoclaved at 120° C. for 1 hour. After cooling, the solutions were diluted to 100 ml. 25 ml were taken from the solutions, pH adjusted to 4.5 and the solutions were diluted to 50 ml. The glucose contents of each solutions was analysed.

The protein content of the various compositions was analyzed by determining nitrogen contents via the Kjeldahl method using 6.25 as a coefficient.

The lipid concentration of the various compositions was analyzed by first diluting 5 g of a dry sample into 100 ml of water. 60 ml of 38% HCl was added and the solutions were heated for 30-60 minutes at 100° C. The solutions were filtered and washed so that they were non-acidic. The sample and filter paper were dried at 105° C. for about 30 minutes. 60 ml of petroleum ether was added to the dried samples and extractions were continued for 2 hours. The samples were evaporated with rotary vacuum evaporator, dried at 105° C. for about 30 minutes, cooled in exiccator for about 1 hour and the lipid contents are weighed. The drying was repeated until the samples reached a constant weight.

The ash contents were analyzed heating an appropriate amount of dry sample at 700° C. for about 8 hours.

The nucleic acid concentrations of the products were analyzed with the method described by Ogurin and Rosen, 1950 in Arch. Biochem. 25, 262-276.

The composition of a commercial Baker's yeast treated according to various alternative extraction solutions are set forth in the following Table 1.

TABLE 1

| | Composition of Yeast Fiber Products (In percent by weight of dry yeast matter) | | | | | |
|---|---|---|---|---|---|---|
| Extraction Method | Total Fiber % | Carbo-hydrate % | Protein % | Lipid % | Ash % | Nucleic Acid % |
| 1% NaOH | 64.5 | 84.6 | 5.2 | 15.6 | 0.6 | 0.075 |
| 2% NaOH | 63.0 | 87.3 | 3.5 | 16.0 | 0.7 | 0.038 |
| 4% NaOH | 64.5 | 94.5 | 2.5 | 12.6 | 0.8 | 0.016 |
| 1% HCl | 31.0 | 28.9 | 52.3 | 19.9 | 1.3 | 0.017 |
| 2% HCl | 33.7 | 29.2 | 47.5 | 24.0 | 1.6 | 0.025 |
| 4% HCl | 44.4 | 37.6 | 34.0 | 27.7 | 1.4 | 0.023 |
| Water | 41.9 | 29.3 | 49.7 | 8.4 | 2.6 | 1.6 |
| Untreated Baker's yeast | 37.3 | 31.6 | 47.4 | 6.9 | 5.8 | 2.0 |

Example 5 - Use of Yeast Fiber Product in Soup 5 grams of yeast fiber product, prepared according to Example 2, were added to 100 grams of a conventional dry cheese soup mix and 100 grams of a conventional dry champion soup mix. The resulting soups contained 3.1% yeast derived fiber. The taste of the soup were regarded by a taste panel as superior to control. The structure of the soup was similar to the control.

Example 6 - Use of Yeast Fiber Product in Cream Cheese 5 grams of yeast fiber product, prepared according to Example 2, were mixed into 100 grams of conventional cream cheese flavored with pepper. The resulting cream cheese contained 3.1% yeast derived fiber. The taste was regarded by a taste panel as near to similar to the control. The structure of the cheese was similar to the control.

Example 7 - Use of Yeast Fiber Product in Tomato Juice 5 grams of yeast fiber product, prepared according to Example 2, were mixed into 100 grams of conventional tomato juice. The resulting tomato juice contained 3.1% yeast derived fiber. The taste of the tomato juice was regarded by a taste panel as near to similar to the control. The structure of the juice was similar to the control.

Example 8 - Use of Yeast Fiber in Yogurt 5 grams of dried yeast fiber product, prepared according to Example 2, were mixed into 150 grams of conventional yogurt spiced with fruits. The resulting yogurt portion contained 3.3 grams of total fiber. The yogurt was tested by a taste panel and the taste was regarded as near to similar to the control. The structure of the yogurt was similar to the control.

It will now be apparent to those skilled in the art that other embodiments, improvements, details and uses can be made consistent with the letter and spirit of the foregoing disclosure and within the scope of this patent, which is limited only by the following claims, construed in accordance with the patent law, including the doctrine of equivalents.

What is claimed is:

1. Process for preparing a yeast cell composition comprising:
   selecting food grade yeast cells;
   preparing a biomass of unruptured cells from the selected yeast cells;
   heating the unruptured yeast cells once and without additional treatment in an acidic or basic aqueous solution such that the contents of the yeast cells are extracted and a majority of the yeast cells are maintained in spherical form; and
   washing the heated yeast cells at least twice with water wherein the composition remaining after the steps of heating and washing comprises at least about 40% by weight of fiber and less than about 0.08% by weight of nucleic acid.

2. The process of claim 1 wherein the biomass of unruptured yeast cells are heated in a solution of base wherein the base is at least about 10% of the weight of the biomass.

3. The process of claim 1 wherein the aqueous solution is alkaline or acidic.

4. The process of claim 3 wherein the aqueous solution is either a 0.5-5% by weight solution of sodium hydroxide or hydrochloric acid.

5. The process of claim 1 wherein the yeast cells are heated for time between about 15 and about 60 minutes.

6. The process of claim 2 wherein the yeast cells are heated for time between about 15 and about 60 minutes.

7. The process of claim 1 wherein the yeast cells are heated in the aqueous solution at a concentration of between about 5 and about 20% by weight on a dry matter basis per unit volume of solution.

8. The process of claim 2 wherein the yeast cells are heated in the aqueous solution at a concentration of between about 5 and about 20% by weight on a dry matter basis per unit volume of solution.

9. The process of claim 1 wherein the yeast cells are heated at a temperature of between about 80° and about 120° C.

10. The process of claim 2 wherein the yeast cells are heated at a temperature of between about 80° and about 120° C.

11. The process of claim 5 wherein the yeast cells are heated at a temperature of between about 80° and about 120° C.

12. Process of claim 1 further comprising drying the washed yeast cells, adding an edible material to a selected amount of the dried yeast cells and mixing the dried yeast cells and edible material.

13. Process of claim 12 wherein the edible material is an edible food material and the edible food material and dried yeast cells are added to each other in amounts such that the dried yeast cells comprise between about 1% and about 5% by weight of the mixture.

14. The process of claim 12 further comprising compressing the mixture into a tablet form.

15. The process of claim 14 wherein the edible material and dried yeast cells are added to each other in amounts such that the dried yeast cells comprise between about 80% and about 90% by weight of the mixture.

16. The process of claim 1 wherein the composition remaining after the steps of heating and washing comprises at least about 30% by weight of carbohydrate.

17. The process of claim 2 wherein the composition remaining after the steps of heating and washing comprises at least about 2% by weight of protein.

18. The process of claim 1 wherein the composition remaining after the steps of heating and washing comprises at least about 10% by weight of lipid.

19. The process of claim 1 wherein the composition remaining after the steps of heating and washing comprises at least about 2% by weight of protein.

20. Process for preparing an improved food product edible by humans comprising:
 selecting food grade yeast cells;
 preparing a biomass of unruptured cells from the selected yeast cells;
 heating the unruptured yeast cells once and without additional treatment in an aqueous solution for a time and at a temperature sufficient to extract the contents from the yeast cells and maintain the majority of the yeast cells in spherical form;
 washing the yeast cells at least twice with water to produce yeast cells having at least about 40% by weight of fiber, between about 30% and about 95% by weight of carbohydrate and less than about 0.08% by weight of nucleic acid;
 adding the yeast cells to an edible food composition in an amount sufficient to bring the concentration of the yeast cell composition on a dry matter basis in the food product to a level of between about 1% and about 5% by weight of the food product.

21. Process of claim 20 wherein the step of selecting food grade yeast cells includes selecting cells from the group consisting of Saccharomyces, Candida and mixtures thereof.

22. Process for preparing an improved animal feed product comprising:
 selecting food grade yeast cells;
 preparing a biomass of unruptured cells from the selected yeast cells;
 heating the unruptured yeast cells once and without additional treatment in an aqueous solution for a time and at a temperature sufficient to extract the contents from the yeast cells and maintain a majority of the yeast cells in spherical form;
 washing the heated yeast cells at least twice with water to produce yeast cells having at least 40% by weight of fiber, between about 30% and about 95% by weight of carbohydrate and less than about 0.08% by weight of nucleic acid;
 adding the yeast cells to a feed composition in an amount sufficient to bring the concentration of the yeast cell composition on a dry matter basis in the feed product to a level of between about 1% and about 5% by weight of the feed product.

23. Process of claim 22 wherein the step of selecting food grade yeast cells includes selecting cells from the group consisting of Saccharomyces, Candida and mixtures thereof.

* * * * *